(12) United States Patent
Yin et al.

(10) Patent No.: US 12,365,044 B2
(45) Date of Patent: Jul. 22, 2025

(54) AUTOMATIC ACTIVATOR COATING DEVICE FOR WIRE AND ARC ADDITIVE MANUFACTURE

(71) Applicant: ZHEJIANG OCEAN UNIVERSITY, Zhoushan (CN)

(72) Inventors: Bo Yin, Zhoushan (CN); Yu Sun, Zhoushan (CN); Meiguang Cao, Zhoushan (CN); Liquan Jin, Zhoushan (CN); Changchang Yang, Zhoushan (CN); Jin Huang, Zhoushan (CN)

(73) Assignee: ZHEJIANG OCEAN UNIVERSITY, Zhoushan (CN)

( * ) Notice: Subject to any disclaimer, the term of this patent is extended or adjusted under 35 U.S.C. 154(b) by 633 days.

(21) Appl. No.: 17/863,983

(22) Filed: Jul. 13, 2022

(65) Prior Publication Data
US 2023/0106001 A1    Apr. 6, 2023

(30) Foreign Application Priority Data

Sep. 28, 2021    (CN) .......................... 202111142989.6

(51) Int. Cl.
| | |
|---|---|
| *B23K 9/16* | (2006.01) |
| *B23K 9/04* | (2006.01) |
| *B33Y 30/00* | (2015.01) |
| *B33Y 40/00* | (2020.01) |

(52) U.S. Cl.
CPC ................ *B23K 9/164* (2013.01); *B23K 9/04* (2013.01); *B33Y 30/00* (2014.12); *B33Y 40/00* (2014.12)

(58) Field of Classification Search
CPC .......... B23K 9/164; B23K 9/04; B33Y 30/00; B33Y 40/00; B33Y 10/00; Y02P 10/25
See application file for complete search history.

(56) References Cited

U.S. PATENT DOCUMENTS

| | | | |
|---|---|---|---|
| 2017/0001379 A1* | 1/2017 | Long ..................... | B29C 64/393 |
| 2019/0126163 A1* | 5/2019 | Szczap ................... | B05B 5/043 |

* cited by examiner

*Primary Examiner* — Robert G Bachner
(74) *Attorney, Agent, or Firm* — Olive Law Group, PLLC

(57) ABSTRACT

An automatic activator coating device for wire and arc additive manufacture includes a base, a mechanical arm is arranged on the upper side of the base, a clamping mechanism is arranged at the lower end of the mechanical arm, a container bottle is clamped on the clamping mechanism, one end of the container bottle is communicated with a sprayer, one end of the sprayer is communicated with an atomizing nozzle, the container bottle is communicated with the gas bottle, and a gas pressure regulating valve is arranged on the gas bottle; and a piston partition is arranged in the sprayer, the container bottle is communicated with an activator converging cavity in one end of the sprayer, a piston rod and a resetting mechanism are arranged in a mounting cavity in the other end of the sprayer, an open hole is formed in the inner surface of the sprayer.

9 Claims, 2 Drawing Sheets

AUTOMATIC ACTIVATOR COATING DEVICE FOR WIRE AND ARC ADDITIVE MANUFACTURE

CROSS REFERENCE TO RELATED APPLICATIONS

Figure 1:
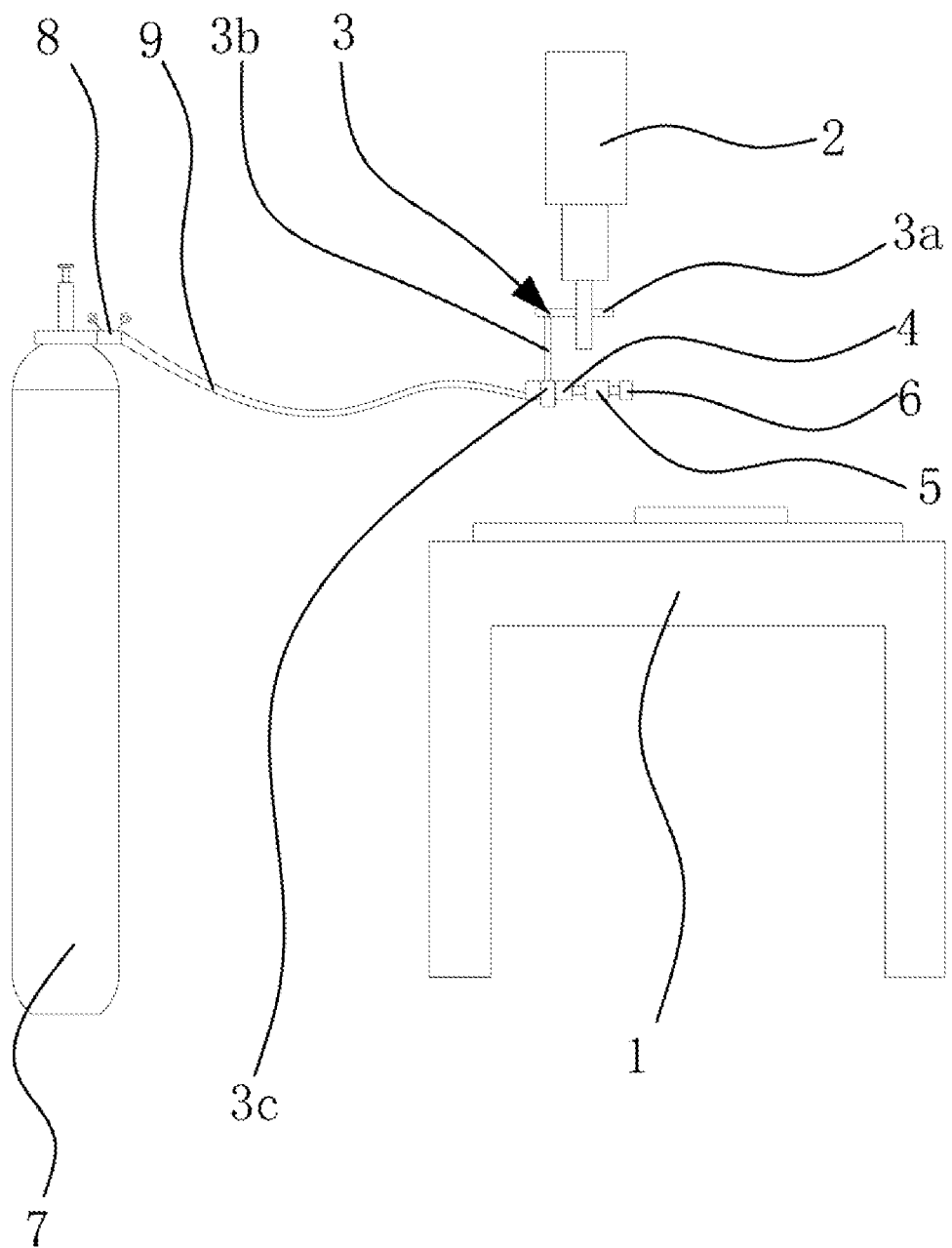

This application is a National Phase U.S. Patent Application which claims priority to Chinese Patent Application No. 2021111429896, filed on Sep. 28, 2021, and Chinese Patent Application No. 2021223718939, filed on Sep. 28, 2021; the contents of which are hereby incorporated by reference herein in their entireties.

TECHNICAL FIELD

The present disclosure belongs to the technical field of additive manufacture devices, and relates to an automatic activator coating device for wire and arc additive manufacture.

BACKGROUND ART

Wire and Arc Additive Manufacture (WAAM) is one of metal additive manufacture technologies, in which metal wires are molten with arcs as heat sources and then, are deposited and stacked on a metal base plate for shaping layer by layer along a set path. Compared with laser and electron beam additive manufacture technologies, the wire and arc additive manufacture technology has the technical advantage of efficient and rapid near-net shaping, has a short period in wire and arc additive manufacture and a high level in automation, such that the digital, intelligent and flexible manufacture can be achieved. The wire and arc additive manufacture technology is high in utilization rate of raw materials, by which parts with complex shapes and structures can be manufactured rapidly; and meanwhile, it has fewer limitations to sizes of the parts. In addition, shaped parts manufactured by wire and arc additive manufacture are made of all-weld metal, are high in compactness and good in mechanical properties, and will become a main development direction of the equipment manufacturing industry in the future. Researches show that when sample parts are prepared through the wire and arc additive manufacture technology, grain structures of welding zones can be perfected and the physical and chemical properties of materials can be improved while a penetration/pool width ratio of welds is increased due to the addition of activators. The penetration and pool width of the welds are directly related to the thickness of a coating, and the uniformity of the coating and the accuracy of the coating quantity may directly affect welding quality.

Chinese patent (publication number: CN110681948B; publication date: Mar. 30, 2021) discloses a WAAM system for a single-power three-wire co-melting drop. The WAAM system includes a three-wire feeder, a wire feeding pipeline, an electric arc gun, a robot and a WAAM power. Wherein the three-wire feeder is used for simultaneously conveying three metal wires into the wire feeding pipeline, the wire feeding pipeline is used for simultaneously guiding the three metal wires into the electric arc gun, and the robot is used for driving the electric arc gun to move. The electric arc gun includes a three-in-one conversion joint, a gun neck main body module and a three-wire conductive nozzle module which are sequentially connected from top to bottom, the upper end of the three-in-one conversion joint is connected with the wire feeding pipeline, the lower end of the gun neck main body module is further provided with a heat dissipation nozzle module, and the heat dissipation nozzle module is arranged outside the three-wire conductive nozzle module in a sleeve mode and is used for radiating the three-wire conductive nozzle module; and the WAAM power is used for enabling the three metal wires to form a common stable molten drop.

The WAAM system disclosed by the above patent literature is not provided with a mechanism for automatically coating workpieces with the activators, and the workpieces can only be manually coated with the activators during WAAM process, so uniform and quantitative coating cannot be achieved.

SUMMARY

The present disclosure provides an automatic activator coating device for wire and arc additive manufacture to solve the above problems in the prior art. The technical problem to be solved by the present disclosure is how to automatically coat a to-be-machined workpiece with an activator during wire and arc additive manufacture.

The objective of the present disclosure can be achieved through the following technical solutions:

An automatic activator coating device for wire and arc additive manufacture, includes a base, wherein, a vertically-down mechanical arm is arranged on the upper side of the base, a clamping mechanism is arranged at the lower end of the mechanical arm, a container bottle is clamped on the clamping mechanism, one end of the container bottle is communicated with a sprayer, one end of the sprayer is communicated with an atomizing nozzle, a gas bottle is arranged on one side of the base, a gas pressure regulating valve is arranged at a gas outlet of the gas bottle, and the gas pressure regulating valve is communicated with the container bottle through a gas feed pipe; a piston partition capable of moving in the length direction of the sprayer is arranged in the sprayer, the piston partition is slidably and hermetically connected with an inner wall of the sprayer, and divides an inner cavity of the sprayer into an activator converging cavity and a mounting cavity, an activator conveying cavity is further formed in a side wall of the sprayer, the container bottle is communicated with the activator converging cavity, the atomizing nozzle is communicated with the activator conveying cavity, a piston rod and a resetting mechanism are arranged in the mounting cavity, one end of the piston rod is fixedly connected with the piston partition, one end of the resetting mechanism is fixedly connected to an inner surface of one end, connected with the atomizing nozzle, in the sprayer, and the other end of the piston rod is movably fit with the other end of the resetting mechanism; and an open hole enabling the interior of the sprayer to be communicated with the activator conveying cavity is formed in the inner surface of the sprayer, and the open hole enables the atomizing nozzle to be communicated with the activator converging cavity through the activator conveying cavity in the side wall of the sprayer.

The working principle of the automatic activator coating device for wire and arc additive manufacture is as follows: when the automatic activator coating device for wire and arc additive manufacture is used, and after the gas pressure regulating valve at the gas outlet of the gas bottle is turned on, high-pressure helium in the gas bottle enters the container bottle through the gas feed pipe, the activator in the container bottle is pushed into the activator converging cavity in the sprayer by the helium, and the piston partition and the piston rod in the sprayer move under the action of gas pressure with continuous buildup of helium pressure; and as the volume of the activator converging cavity and the mounting cavity in the sprayer is variable, after the piston partition moves downwards, the volume of the activator converging cavity is expanded, the activator converging cavity is communicated with the activator conveying cavity, the helium moves at a high speed to convey the activator in the activator converging cavity into the atomizing nozzle through the open hole and the activator conveying cavity in the sprayer, the mechanical arm drives the clamping mechanism and the container bottle to move along a programmed path, and the container bottle drives the atomizing nozzle to perform coating of the activator. The helium in the gas bottle is also sprayed out of the atomizing nozzle along with the activator, and can serve as protective gas during machining. After coating is completed, the gas pressure regulating valve on the gas bottle is turned off, the piston rod and the piston partition in the sprayer are reset under the action of the resetting mechanism, and the activator converging cavity and the activator conveying cavity are interrupted. The automatic activator coating device for wire and arc additive manufacture can automatically coat the workpiece with the activator during wire and arc additive manufacture, and implements coating with the atomizing nozzle, so that the coating effect is good. The automatic activator coating device for wire and arc additive manufacture can also control the pressure of the helium sprayed out of the gas bottle by regulating the gas pressure regulating valve on the gas bottle, thereby controlling the quantity of the activator sprayed out of the atomizing nozzle.

In the above automatic activator coating device for wire and arc additive manufacture, the resetting mechanism includes a spring and an abutting seat, one end of the spring is fixedly connected to the inner surface of one end, connected with the atomizing nozzle, of the sprayer, the other end of the spring is fixedly connected with the abutting seat, and one end, away from the piston partition, of the piston rod is movably fit with the abutting seat. The piston rod compresses the spring through the abutting seat when moving, and the spring drives the piston rod to reset when reset.

In the above automatic activator coating device for wire and arc additive manufacture, a fitting groove is formed in one end, facing the piston rod, of the abutting seat, and one end of the piston rod is movably inserted into the fitting groove.

In the above automatic activator coating device for wire and arc additive manufacture, a source nipple communicated with the activator converging cavity is arranged at one end, away from the atomizing nozzle, of the sprayer, and the container bottle is in threaded connection with the source nipple.

In the above automatic activator coating device for wire and arc additive manufacture, the clamping mechanism includes a fixing rod and a clamping rod, the fixing rod is horizontally arranged and fixedly connected on the mechanical arm, the clamping rod is vertically arranged, and a top of the clamping rod is fixedly connected with the fixing rod, a bottom of the clamping rod is fixedly connected with a clamping part, and the container bottle is clamped on the clamping part. The clamping rod can stably clamp the container bottle, and can also be driven by the mechanical arm to drive the container bottle and the atomizing nozzle to move.

Compared with the prior art, the present disclosure has the following beneficial effects:

1. The activator in the automatic activator coating device is sprayed to the to-be-machined workpiece by the atomizing nozzle under the action of gas pressure in the gas bottle, so that the spray coating effect is good.
2. The automatic activator coating device can change the pressure of the gas sprayed out of the gas bottle by regulating the gas pressure adjusting valve, thereby controlling the quantity of the activator sprayed out of the atomizing nozzle.
3. The container bottle in the automatic activator coating device is fixed to the mechanical arm through the clamping mechanism, and a user can plan a coating path through programming and control the mechanical arm and the atomizing nozzle to move, so as to achieve an automatic coating process.

BRIEF DESCRIPTION OF THE DRAWINGS

FIG. 1 is a structural schematic diagram of an automatic activator coating device; and FIG. 2 is a section view of a sprayer.

In the drawings: 1. Base; 2. Mechanical arm; 3. Clamping mechanism; 3*a*. Fixing rod; 3*b*. Clamping rod; 3*c*. Clamping part; 4. Container bottle; 5. Sprayer; 5*a*. Activator converging cavity; 5*b*. Mounting cavity; 5*c*. Activator conveying cavity; 5*d*. Open hole; 5*e*. Source nipple; 6. Atomizing nozzle; 7. Gas bottle; 8. Gas pressure regulating valve; 9. Gas feed pipe; 10. Piston partition; 11. Piston rod; 12. Resetting mechanism; 12*a*. Spring; 12*b*. Abutting seat; and 12*b*1. Fitting groove.

DETAILED DESCRIPTION OF THE EMBODIMENTS

The following is specific embodiments of the present disclosure, the technical solutions of the present disclosure are further described with reference to the accompanying drawings, but the present disclosure is not limited to these embodiments.

As shown in FIG. 1 and FIG. 2, an automatic activator coating device for wire and arc additive manufacture includes a base 1, a vertically-down mechanical arm 2 is arranged on the upper side of the base 1, a clamping mechanism 3 is arranged at a lower end of the mechanical arm 2, and a container bottle 4 is clamped on the clamping mechanism 3. The clamping mechanism 3 includes a fixing rod 3*a* and a clamping rod 3*b*, the fixing rod 3*a* is horizontally arranged and fixedly connected on the mechanical arm 2, the clamping rod 3*b* is vertically arranged, and a top of the clamping rod is fixedly connected with the fixing rod 3*a*, a bottom of the clamping rod 3*b* is fixedly connected with a clamping part 3*c*, and the container bottle 4 is clamped on the clamping part 3*c*. One end of the container bottle 4 is communicated with a sprayer 5, a source nipple 5*e* communicated with an activator converging cavity 5*a* is arranged at one end of the sprayer 5, the container bottle 4 is in threaded connection with the source nipple 5*e*, and the other end of the sprayer 5 is communicated with an atomizing nozzle 6. The atomizing nozzle 6 in the embodiment is the prior art, which is not repeated here, for example, it can have the same or similar structure with the patent of China "Anti-blocking secondary atomizing nozzle system" (publication number: CN210886537U; publication date: Jun. 30, 2020). A gas bottle 7 is arranged on one side of the base 1, a gas pressure regulating valve 8 is arranged at a gas outlet of the gas bottle 7, and the gas pressure regulating valve 8 is communicated with the container bottle 4 through a gas feed pipe 9. A piston partition 10 capable of moving in the length direction of the sprayer is arranged in the sprayer 5, the piston partition 10 is hermetically connected with an inner surface of the sprayer 5, and divides an inner cavity of the sprayer 5 into the activator converging cavity 5a and a mounting cavity 5b. An activator conveying cavity 5c is further formed in a side wall of the sprayer 5, the container bottle 4 is communicated with the activator converging cavity 5a, the atomizing nozzle 6 is communicated with the activator conveying cavity 5c. A piston rod 11 and a resetting mechanism 12 are arranged in the mounting cavity 5b, one end of the piston rod 11 is fixedly connected with the piston partition 10, one end of the resetting mechanism 12 is fixedly connected to the inner surface of one end, connected with the atomizing nozzle 6, of the sprayer 5, and the other end of the piston rod 11 is movably fit with the other end of the resetting mechanism 12. An open hole 5d is formed in the inner surface of the sprayer 5, and the open hole 5d is communicated with the atomizing nozzle 6 through the activator conveying cavity 5c.

An operator turns on the gas pressure regulating valve 8, and helium in the gas bottle 7 enters the container bottle 4 through the gas feed pipe 3. An activator in the container bottle 4 enters the activator converging cavity 5a through the source nipple 5e under the action of helium pressure, and the piston partition 10 and the piston rod 11 move in the sprayer 5 under the action of the helium pressure. The piston partition 10 moves downwards, after the volume of the activator converging cavity 5a is increased downwards, the activator converging cavity 5a is communicated with the activator conveying cavity 5c through the open hole 5d. The activator in the activator converging cavity 5a is conveyed into the atomizing nozzle 6 through the open hole 5d and the activator conveying cavity 5c, the high-pressure helium provided by the gas bottle 7 may drive the activator to move at a high speed, the activator moving at the high speed may form spray when conveyed in the activator conveying cavity 5c, and is sprayed out through an outlet of the atomizing nozzle 6 to form fine atomized spray. The atomizing nozzle 6 is also driven by the mechanical arm 2 and the clamping mechanism 3 to move along a programmed path, thereby achieving the objectives of automatic and uniform spray coating. The helium in the gas bottle 7 is also sprayed out of the atomizing nozzle 6 along with the activator, which serves as protective gas during machining. The coating amount corresponds to gas pressure, and the two factors are associated with each other. The operator regulates the gas pressure regulating valve 8 to change the pressure of the helium sprayed out of the gas bottle 7, so as to change the coating amount of the atomizing nozzle 6. The helium pressure is usually 0.4 MP-0.6 MP during coating, and the width of a sector zone formed when the surface of a workpiece is coated with the activator is 5 cm-10 cm.

Figure 2:
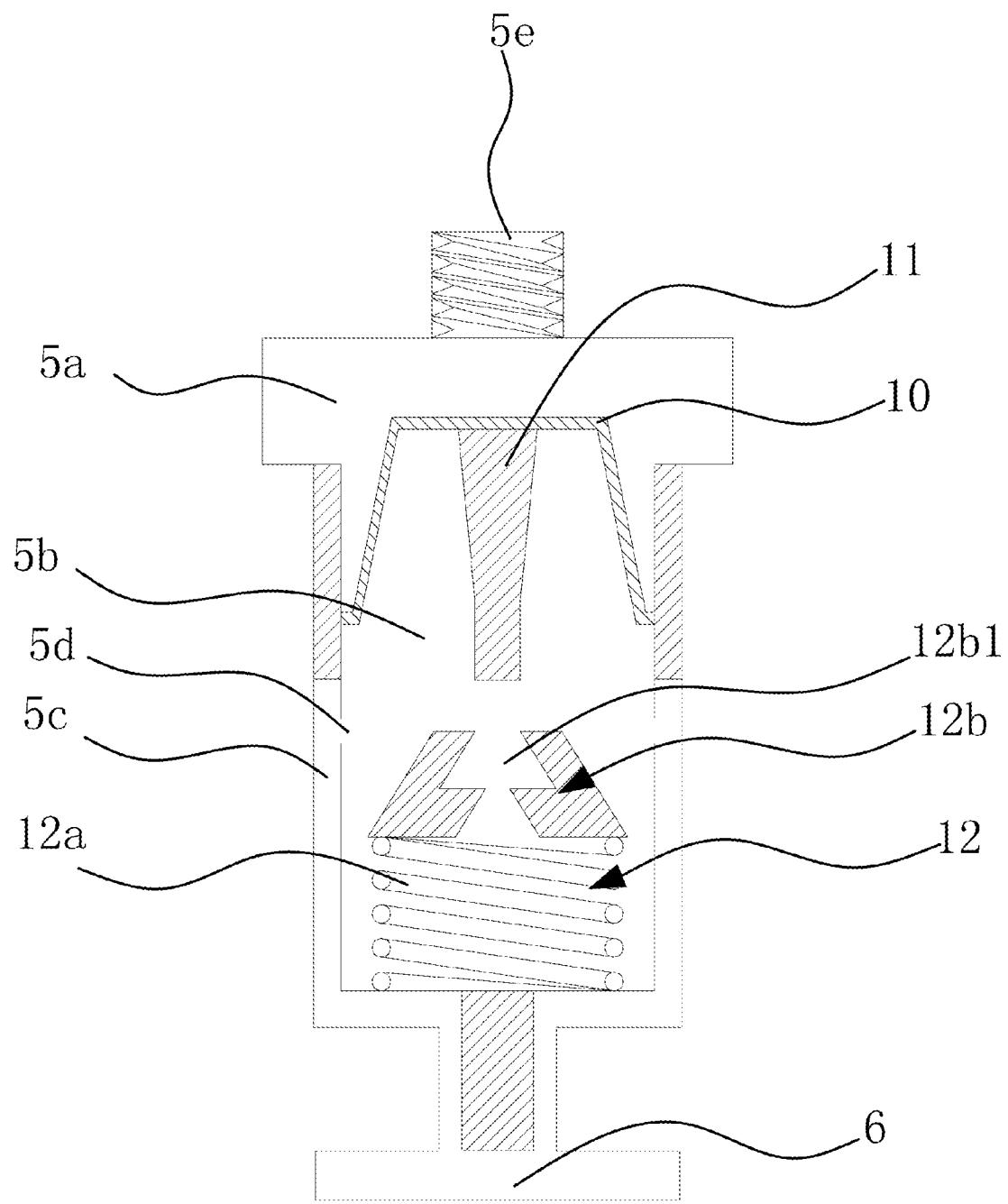

Furthermore, as shown in FIG. 2, the resetting mechanism 12 includes a spring 12a and an abutting seat 12b. One end of the spring 12a is fixedly connected to the inner surface of one end, connected with the atomizing nozzle 6, of the sprayer 5, the other end of the spring 12a is fixedly connected with the abutting seat 12b, and one end, away from the piston partition 10, of the piston rod 11 is movably fit with the abutting seat 12b. A fitting groove 12b1 is formed in one end, facing the piston rod 11, of the abutting seat 12b, and one end of the piston rod 11 is movably inserted into the fitting groove 12b1. The piston rod 11 drives the abutting seat 12b to move, the abutting seat 12b compresses the spring 12a, and the spring 12a drives the piston rod 11 and the piston partition 10 to reset after the gas pressure regulating valve 8 on the gas bottle 7 is turned off.

The specific embodiments described herein are only used for illustrating the spirit of the present disclosure. Those skilled in the technical field to which the present disclosure belongs can make various modifications or supplements or make replacements in a similar way on the described specific embodiments, but these modifications or supplements or replacements will not deviate from the spirit of the present disclosure or go beyond the scope defined by accompanying claims.

Although the terms: 1. Base; 2. Mechanical arm; 3. Clamping mechanism; 3a. Fixing rod; 3b. Clamping rod; 3c. Clamping part; 4. Container bottle; 5. Sprayer; 5a. Activator converging cavity; 5b. Mounting cavity; 5c. Activator conveying cavity; 5d. Open hole; 5e. Source nipple; 6. Atomizing nozzle; 7. Gas bottle; 8. Gas pressure regulating valve; 9. Gas feed pipe; 10. Piston partition; 11. Piston rod; 12. Resetting mechanism; 12a. Spring; 12b. Abutting seat, 12b1. Fitting groove, etc. are mostly used herein, the possibility of using other terms is not excluded. These terms are only used for more conveniently describing and explaining the essence of the present disclosure, and explaining them as any additional limitation is contrary to the spirit of the present disclosure.

What is claimed is:

1. An automatic activator coating device for wire and arc additive manufacture, comprising a base, wherein, a vertically-down mechanical arm is arranged on an upper side of the base, a clamping mechanism is arranged at a lower end of the mechanical arm, a container bottle is clamped on the clamping mechanism, one end of the container bottle is communicated with a sprayer, one end of the sprayer is communicated with an atomizing nozzle; a gas bottle is arranged on one side of the base, a gas pressure regulating valve is arranged at a gas outlet of the gas bottle, and the gas pressure regulating valve is communicated with the container bottle through a gas feed pipe; a piston partition capable of moving in a length direction of the sprayer is arranged in the sprayer, the piston partition is slidably and hermetically connected with an inner wall of the sprayer, and divides an inner cavity of the sprayer into an activator converging cavity and a mounting cavity, an activator conveying cavity is further formed in a side wall of the sprayer, the container bottle is communicated with the activator converging cavity, the atomizing nozzle is communicated with the activator conveying cavity, a piston rod and a resetting mechanism are arranged in the mounting cavity, one end of the piston rod is fixedly connected with the piston partition, one end of the resetting mechanism is connected to an inner surface of one end, connected with the atomizing nozzle, of the sprayer, an other end of the piston rod is movably fit with an other end of the resetting mechanism, and an open hole enabling an interior of the sprayer to be communicated with the activator conveying cavity is formed in the inner surface of the sprayer.

2. The automatic activator coating device for wire and arc additive manufacture according to claim 1, wherein, the resetting mechanism comprises a spring and an abutting seat, one end of the spring is fixedly connected to the inner surface of one end, connected with the atomizing nozzle, of the sprayer, an other end of the spring is fixedly connected with the abutting seat, and one end, away from the piston partition, of the piston rod is movably fit with the abutting seat.

3. The automatic activator coating device for wire and arc additive manufacture according to claim 2, wherein, a fitting groove is formed in one end, facing the piston rod, of the abutting seat, and one end of the piston rod is movably inserted into the fitting groove.

4. The automatic activator coating device for wire and arc additive manufacture according to claim 1, wherein, a source nipple communicated with the activator converging cavity is arranged at one end, away from the atomizing nozzle, of the sprayer, and the container bottle is in threaded connection with the source nipple.

5. The automatic activator coating device for wire and arc additive manufacture according to claim 4, wherein, the clamping mechanism comprises a fixing rod and a clamping rod, the fixing rod is horizontally arranged and fixedly connected on the mechanical arm, the clamping rod is vertically arranged, and a top of the clamping rod is fixedly connected with the fixing rod; a bottom of the clamping rod is fixedly connected with a clamping part, and the container bottle is clamped on the clamping part.

6. The automatic activator coating device for wire and arc additive manufacture according to claim 2, wherein, a source nipple communicated with the activator converging cavity is arranged at one end, away from the atomizing nozzle, of the sprayer, and the container bottle is in threaded connection with the source nipple.

7. The automatic activator coating device for wire and arc additive manufacture according to claim 6, wherein, the clamping mechanism comprises a fixing rod and a clamping rod, the fixing rod is horizontally arranged and fixedly connected on the mechanical arm, the clamping rod is vertically arranged, and a top of the clamping rod is fixedly connected with the fixing rod; a bottom of the clamping rod is fixedly connected with a clamping part, and the container bottle is clamped on the clamping part.

8. The automatic activator coating device for wire and arc additive manufacture according to claim 3, wherein, a source nipple communicated with the activator converging cavity is arranged at one end, away from the atomizing nozzle, of the sprayer, and the container bottle is in threaded connection with the source nipple.

9. The automatic activator coating device for wire and arc additive manufacture according to claim 8, wherein, the clamping mechanism comprises a fixing rod and a clamping rod, the fixing rod is horizontally arranged and fixedly connected on the mechanical arm, the clamping rod is vertically arranged, and a top of the clamping rod is fixedly connected with the fixing rod; a bottom of the clamping rod is fixedly connected with a clamping part, and the container bottle is clamped on the clamping part.

\* \* \* \* \*